April 3, 1951 — A. C. KORTE — 2,547,761
FUEL PUMP MOUNTING
Filed June 30, 1949
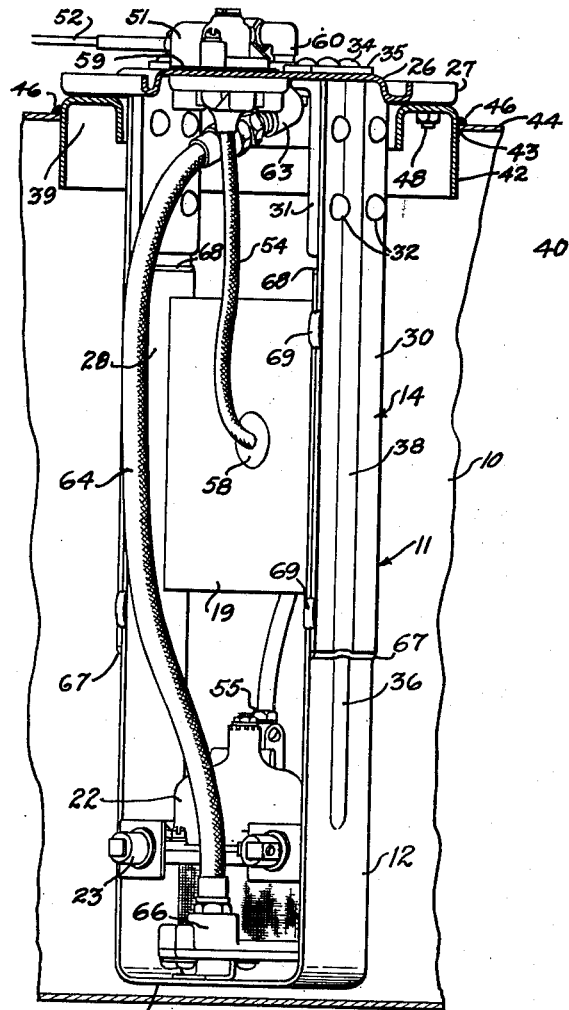
FIG. 1.
FIG. 3.
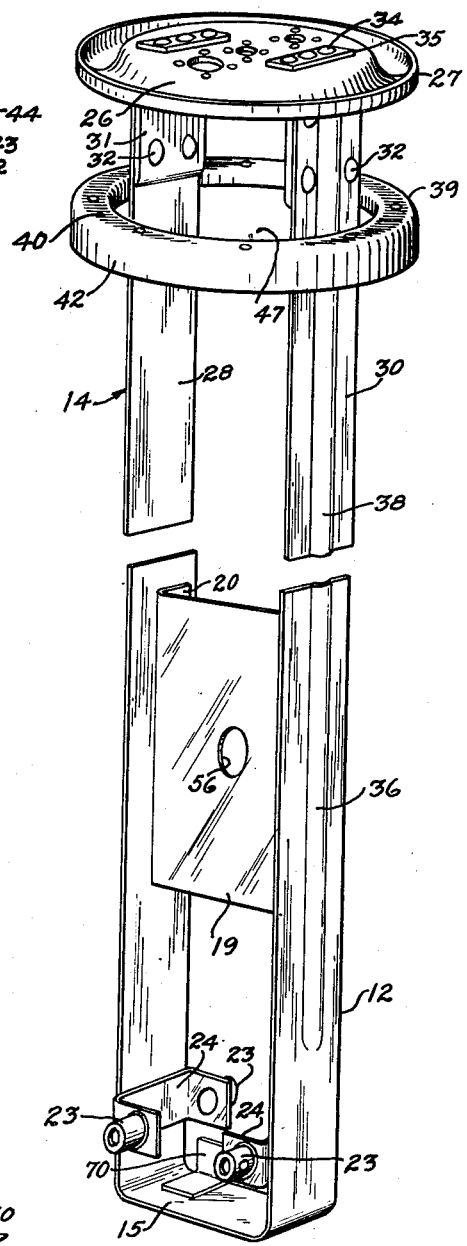
FIG. 2.
INVENTOR.
ALFRED C. KORTE
BY
*George R. Ericson*
ATTORNEY Patented Apr. 3, 1951

2,547,761

UNITED STATES PATENT OFFICE 2,547,761

FUEL PUMP MOUNTING

Alfred C. Korte, St. Louis, Mo., assignor to Carter Carburetor Corporation, St. Louis, Mo., a corporation of Delaware Application June 30, 1949, Serial No. 102,337

2 Claims. (Cl. 222—385)

This invention relates to means for mounting an accessory such as a fuel pump, relative to a fuel tank, and has particular reference to the provision of an improved support or bracket structure for supporting and locating an accessory, preferably an electric fuel pump, within and near the bottom of a fuel tank.

In general, the present invention concerns an improved fuel pump supporting bracket structure which is adapted for the support of an electric fuel pump within and near the bottom of a fuel tank, and which is of an adjustable construction enabling a ready adaptation thereof to tanks of various depths such as to assure fuel pump location in the desired position near the tank bottom. Among the more important objects of the invention are the provision of a bracket of the character above indicated, affording a stable support for an electric fuel pump; the provision of a bracket adapted to be supported at or near an upper or top zone of the tank, and bracket mounting relative to the tank such that the bracket and the fuel pump carried thereby, may be inserted in or removed from the tank as a unit.

The foregoing and other objects will appear from the following description of a presently preferred embodiment of the invention, as illustrated in the accompanying drawing wherein:

Fig. 1 is a vertical section through a portion of a fuel tank, illustrating a presently preferred form of bracket structure mounted relative to the tank and supporting an electric fuel pump;

Fig. 2 is a view in perspective of the bracket structure, shown apart from the tank and with the cooperative parts of the bracket in relative separation;

Fig. 3 is a view in elevation at the top of the tank in the zone of bracket mounting thereon.

Referring initially to Fig. 1, a fuel tank 10 is shown in fragmentary section, and suspended therein is the bracket structure 11 forming the subject of the present invention. By present preference, the bracket is essentially a two-part structure comprised of a lower section 12 and an upper section 14. The lower bracket section 12 is of U-shape, affording a relatively flat bottom element 15 and upstanding, parallel legs or arms. Structurally bracing the arms of section 12 is a flanged plate 19 spanning the arms therebetween and having its flanges, one of which is shown at 20 in Fig. 2, suitably secured to the bracket arms as by welding or the like. Bracket section 12 thus forms a saddle-like carriage for an accessory such as the electric fuel pump 22 shown in elevation in Fig. 1. While pump 22 may be of any desired type, the pump shown is of the type covered in my Patent No. 2,394,860. It is supported between the arms of bracket section 12 and on bottom element 15 thereof through suitable trunnions at the corners of the pump casing, the trunnions seating in trunnion sockets 23 carried by bracket elements 24 suitably attached to bracket section 12. The trunnion mounting of the pump is here such as to afford ready access to the trunnions, to permit and facilitate ready mounting or removal of the pump relative to the bracket section 12, as this will appear from Figs. 1 and 2. Suitable pump mountings are covered in my Patents 2,271,560 and 2,424,469.

Upper bracket section 14 comprises a cap plate 26 having a channel section peripheral mounting portion 27, and relatively spaced, parallel plate-like arms 28 and 30 depending from the underside of the plate. Each of the arms is connected to plate 26 preferably by an angle piece 31 suitably attached to the arm as by rivets 32, and to the plate 26 by rivets 34 extending through a strengthening plate or washer element 35 on the upper face of the plate. The spacing of the arms 28 and 30 is here such that in bracket assembly, these arms embrace the arms of the lower section 12, in surface contact with the latter (Fig. 1). According to present preference, one arm of lower bracket section 12 is formed to provide an outstanding longitudinal rib 36 curved or arcuate in section as indicated in Fig. 2 over the major portion of its length from the upper or free end of the arm. Rib 36 in bracket assembly, is received in a similarly shaped channel guideway 38 (Fig. 2) extending longitudinally of arm 30 in the upper section, the rib and channel aiding in the assembly of the bracket parts and retaining the engaged bracket arms in longitudinal alignment during adjustment. These guide elements may be provided on both sides of the bracket parts if desired.

In the present example, the bracket is supported at or near the top of tank 10, and to facilitate such support, there is provided an inverted U-section mounting member 39 having a web portion 40, and a depending outer flange or skirt 42 projected through an opening 43 in the top wall 44 of the tank (Fig. 1). The skirt of the member is suitably supported on and sealed to the tank wall 44, as by a continuous fillet-weld 46 at the juncture of the skirt and the tank wall margin at opening 43. Member 39 provides a circular opening 47 to receive the bracket therethrough, and affords a bracket mount through its web 40 adapted for supporting engagement with the peripheral portion 27 of bracket cap plate 26. In bracket mounting, portion 27 is suitably secured to web 40 of member 39, as by bolts 48.

As indicated particularly in Fig. 1, there is mounted on plate 26 an electric terminal fitting 51 within which is effected in suitable manner, electrical connection between a power input conductor 52 and a lead 54. Lead 54 extends downwardly between the bracket arms, to connection at 55 with the electric motor of the pump unit 22. Moreover, the lead preferably is fixed or anchored intermediate its ends, by passage thereof through an opening 56 in bracket brace plate 19, the lead being snugly held at said opening by an insulating bushing 58 in opening 56 (Fig. 1). Fitting 51 in assembly to plate 26, is preferably insulated therefrom and sealed against fluid-leakage by an insulating gasket 59.

Carried by cap plate 26 adjacent fitting 51, is a fuel line elbow fitting 60 affording a connection to the fuel delivery line (not shown) leading to the engine or other point of fuel use. Fitting 60 extends through plate 26, being suitably sealed in its projection through the plate, and connects with a further fitting 63. The latter provides a connection for the upper end of a flexible conduit 64 leading from the discharge end 66 of the pump 22. Other structure normally carried in or by the tank, such as a gasoline gauge, may be mounted on the cap plate, if desired.

In application of the now described bracket structure, given a tank such as the tank 10 illustrated, provided with the mounting member 39 thereon, the depth of the tank is measured as a first step. The depth here measured is the vertical distance between the tank bottom and the plane of the web 40 of member 39. Once this distance is determined, the bracket having the arms 28 and 30 embracing the legs of lower section 12 is adjusted by relative longitudinal displacement of the sections 12 and 14, until the assembled length thereof between the under side of the bottom element 15 and the under side of the mounting flange 27 of cap plate 26, is only slightly less than the tank depth measured as above described. Preferably, the bracket length is thus set at a value less than but approximating the tank depth indicated, so that in bracket mounting on the tank, bracket bottom element 15 will be disposed relatively close to the tank bottom, as to about the extent indicated in the view of Fig. 1. Upon longitudinal adjustment of the bracket structure in accordance with the given tank to which it is to be applied, the engaged bracket arms are firmly connected in any suitable and positive manner which may be of a readily detachable character, or of a non-detachable nature. As is here preferred, such connection is effected conveniently as illustrated in Fig. 1, by welding the free ends and edges of arms 28 and 30 to the legs of section 12 as indicated at 67, 68, and 69. The edge welds prevent buckling. A small angle bracket 70 on the bottom element 15 insures proper positioning of the pump while matching ribs or flutes 36, 38 insure correct assembly of the bracket parts. The complete bracket unit including the pump thereon, then is ready for tank mounting, effected by insertion of the unit through the opening 47 of the mounting member 39, until the bracket plate flange 27 rests on web 40, whereupon the flange 27 is secured or bolted to the web 40 as hereinbefore described. It is apparent from the foregoing, that the entire unit may be unbolted and lifted out of the tank whenever desired, as for inspection, repair or replacement of the pump 22.

The bracket structure having its parts constructed by preference, from suitable metallic material of a character to afford a stable support for the pump unit, thus is readily adaptable through the length adjustment feature described, to any one of a number of tanks differing in the depth dimension herein indicated. Moreover, in order to permit full adjustment of the bracket lengths within the limits determined by the lengths of the bracket arms, the lengths of the flexible pump discharge conduit 64 and the motor power lead 54 are such as to accommodate a maximum extension of the bracket.

It is to be noted in particular, that the presently improved bracket structure mounted in suspension from the top of the tank, presents an arrangement which not only facilitates ready insertion or removal of the bracket unit, but avoids bracket support connections through the side or bottom wall of the tank.

Having now described and illustrated the invention in respect to a presently preferred embodiment thereof, it will appear that the bracket structure may be modified without departing from the spirit and full intended scope of the invention as defined by the appended claims.

I claim:

1. Bracket means for supporting and locating an accessory such as an electric fuel pump, within and near the bottom of a fuel tank, comprising a bracket mounting member adapted for attachment to the top wall of the tank and providing a bracket-receiving opening, a bracket adapted for positionment through said opening and vertically in the tank, with its lower end adjacent the tank bottom, said bracket including fuel pump support means at the lower end thereof, a plate on the upper end of the bracket, providing a peripheral flange for seating on and attachment to said mounting member, the plate and its flange serving to close the opening in said mounting member, a terminal connector on said plate for electric power supply connection to the electric fuel pump supported by the bracket, and a conduit fitting carried by and exposed on said plate, for connection of the pump discharge to a fuel delivery line.

2. Bracket means as set forth in claim 1, wherein said bracket includes arm elements in relative overlapping engagement and secured together, with the extent of overlap of said arms predetermined such as to determine the length of the bracket between its lower end and the peripheral flange of said plate, at a value less than but approximating the depth of the tank.

ALFRED C. KORTE.

REFERENCES CITED

The following references are of record in the file of this patent:

UNITED STATES PATENTS

| Number | Name | Date |
| --- | --- | --- |
| 1,919,173 | Schutt | July 18, 1933 |
| 2,273,214 | McConaghy | Feb. 17, 1942 |